(12) United States Patent  
Van Liew et al.

(10) Patent No.: US 8,804,160 B2  
(45) Date of Patent: Aug. 12, 2014

(54) METHOD FOR PROVIDING PRINTING SERVICES AND PRINTING CONTROL METHOD FOR CONTROLLING A KEY TO ACQUIRE ADDITIONAL AUTHORIZED PAGES AS NEEDED

(71) Applicant: Hon Hai Precision Industry Co., Ltd., New Taipei (TW)

(72) Inventors: Edward John Van Liew, Santa Clara, CA (US); Joseph Alan Wolfman, Santa Clara, CA (US); Ray Lloyd Pickup, Santa Clara, CA (US); Ernest Dale Jenkins, Santa Clara, CA (US); John Anthony Underwood, Santa Clara, CA (US)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 0 days.

(21) Appl. No.: 13/735,048

(22) Filed: Jan. 7, 2013

(65) Prior Publication Data

US 2014/0192377 A1     Jul. 10, 2014

(51) Int. Cl.  
*G06F 3/12*     (2006.01)

(52) U.S. Cl.  
USPC .................... 358/1.14; 358/1.13; 358/1.15

(58) Field of Classification Search  
CPC ................. G06F 21/6209; G06F 3/12  
USPC ................................ 358/1.14–1.16  
See application file for complete search history.

(56) References Cited

U.S. PATENT DOCUMENTS

| | | | |
|---|---|---|---|
| 7,320,140 B1 * | 1/2008 | Boyer et al. | 726/6 |
| 2010/0171986 A1 * | 7/2010 | Amorosa et al. | 358/1.16 |

* cited by examiner

*Primary Examiner* — Qian Yang  
(74) *Attorney, Agent, or Firm* — Novak Druce Connolly Bove + Quigg LLP

(57) ABSTRACT

A vendor provides, and an operator obtains a method dedicated printer bundle. The printer bundle includes a printer having a key interface, an ink supply, and a key for association with the printer through the key interface. The key is provided with key data pertaining to an authorized page count. The printer operator is allowed to acquire additional authorized pages as needed. When the printer ink supply becomes depleted, the printer operator is provided with additional ink at no or insignificant cost.

14 Claims, 8 Drawing Sheets

METHOD FOR PROVIDING PRINTING SERVICES AND PRINTING CONTROL METHOD FOR CONTROLLING A KEY TO ACQUIRE ADDITIONAL AUTHORIZED PAGES AS NEEDED

BACKGROUND

1. Technical Field

The present disclosure relates to methods for providing printing services and methods for controlling printers.

2. Description of Related Art

Consumer printer use costs are commonly based on an initial printer acquisition cost combined with replacement ink costs. Ink is typically replaced on an unpredictable schedule depending upon printer use frequency. This subjects printer owners to unpredictable replacement ink costs.

A printer use control method that more accurately reflects a regular and constant per page printing cost may be more appealable to users.

Therefore, there is room for improvement within the art.

DETAILED DESCRIPTION

One embodiment of a method for providing printer services and printing control methods may include at least the following steps.

Figure 5A:
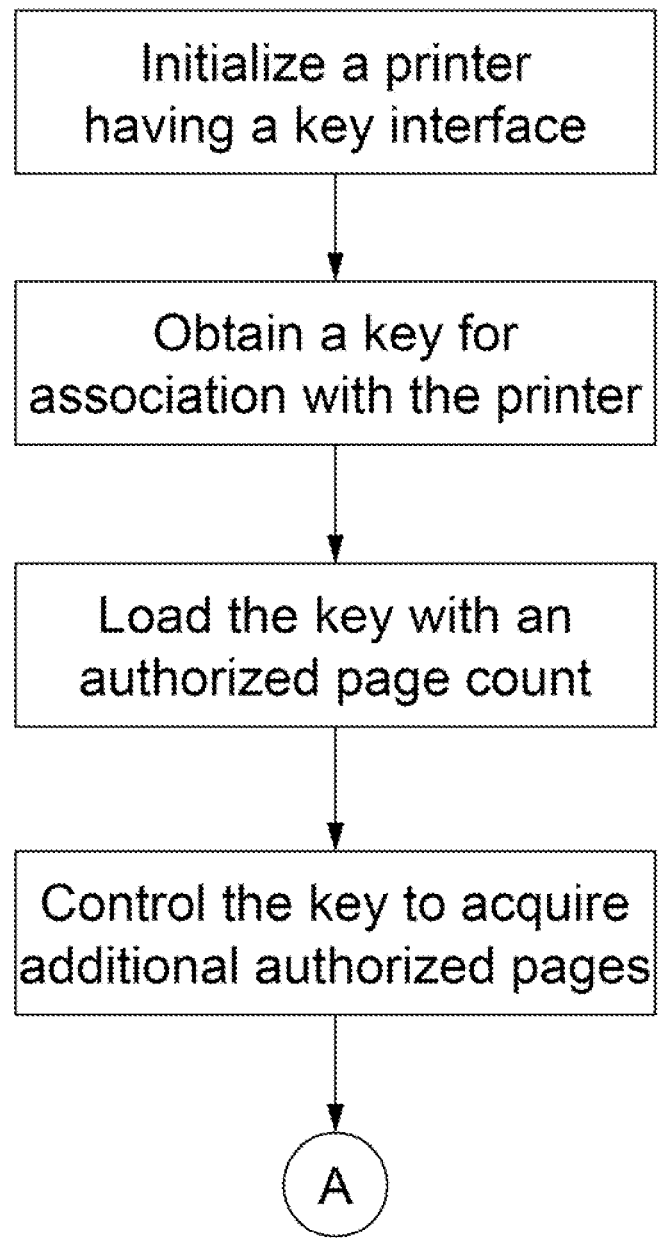
FIGS. 5A and 5B are flowcharts of the printer-host systems performing a printing method.
Figure 5B:
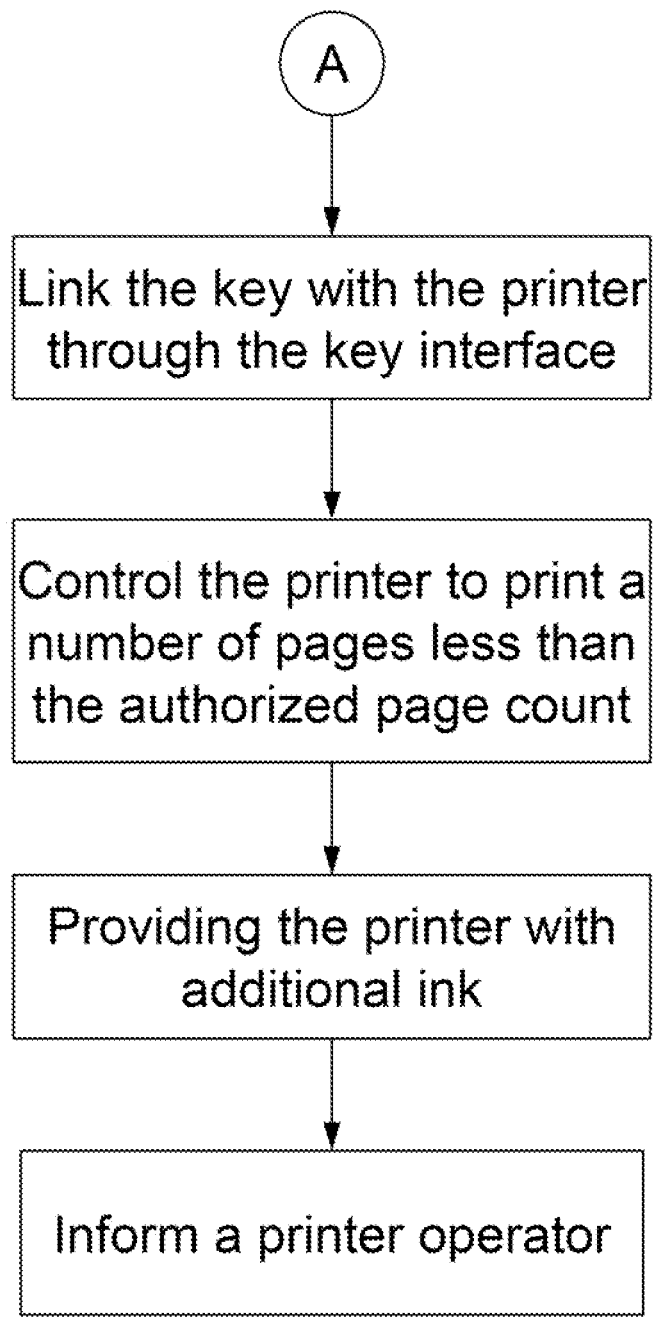

A vendor provides, and an operator obtains (for example, by purchase, gift, etc.), a method dedicated printer bundle. The printer bundle may carry out methods illustrated in FIGS. 5A and 5B.

The printer bundle is for use with a host system. The host system can comprise or include a conventional PC, PDA, tablet computer, or smart phone. etc.

The printer bundle includes a printer, an ink supply (sometimes referred to in the art as a "pen"), a key interface, and an associated key.

The printer can comprise a stand-alone printer for connection with the host system by wired or wireless connection. The printer can also be a printer combined with a docking station commonly used with dockable systems, such as PDAs, tablets and smart phones.

The printer will not operate unless linked directly (printer-key) (FIG. 1A) or indirectly (printer-host system-key) (FIG. 1B) to a properly authorized key.

The key can be or include a physical or virtual key.

Figure 1A:
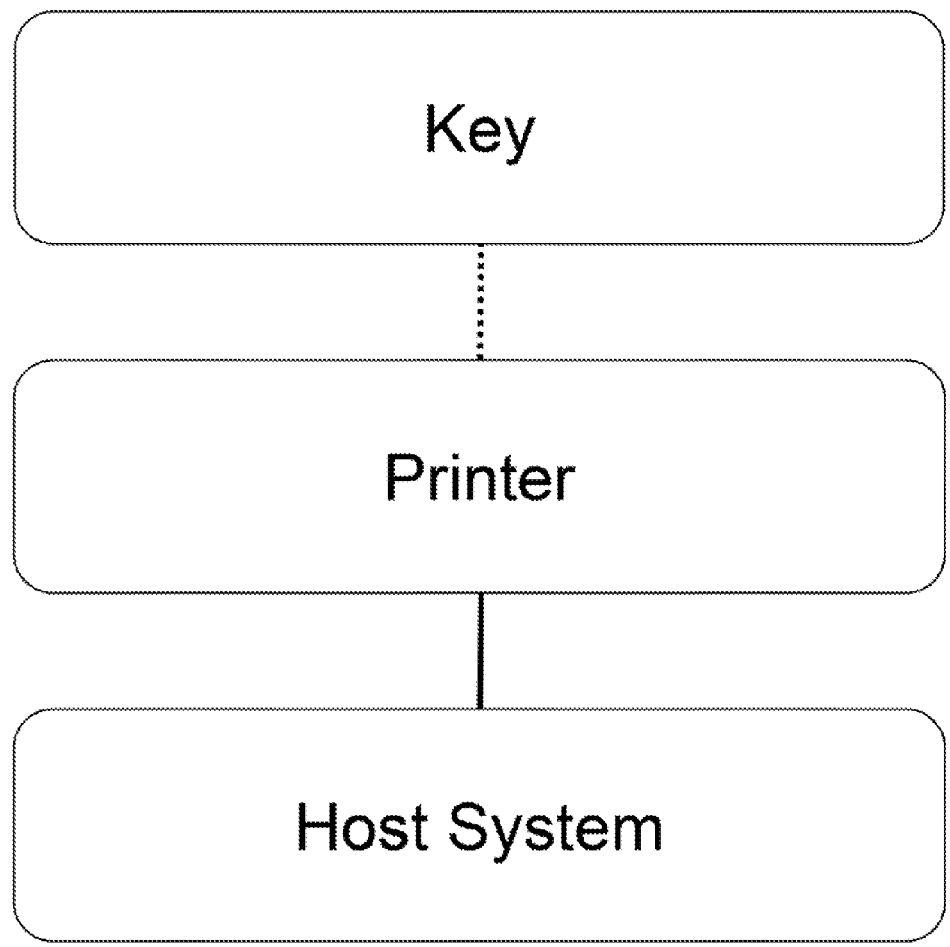
FIGS. 1A and 1B are simplified block diagrams depicting layouts for printer-host systems used with wired physical keys.
Figure 1B:
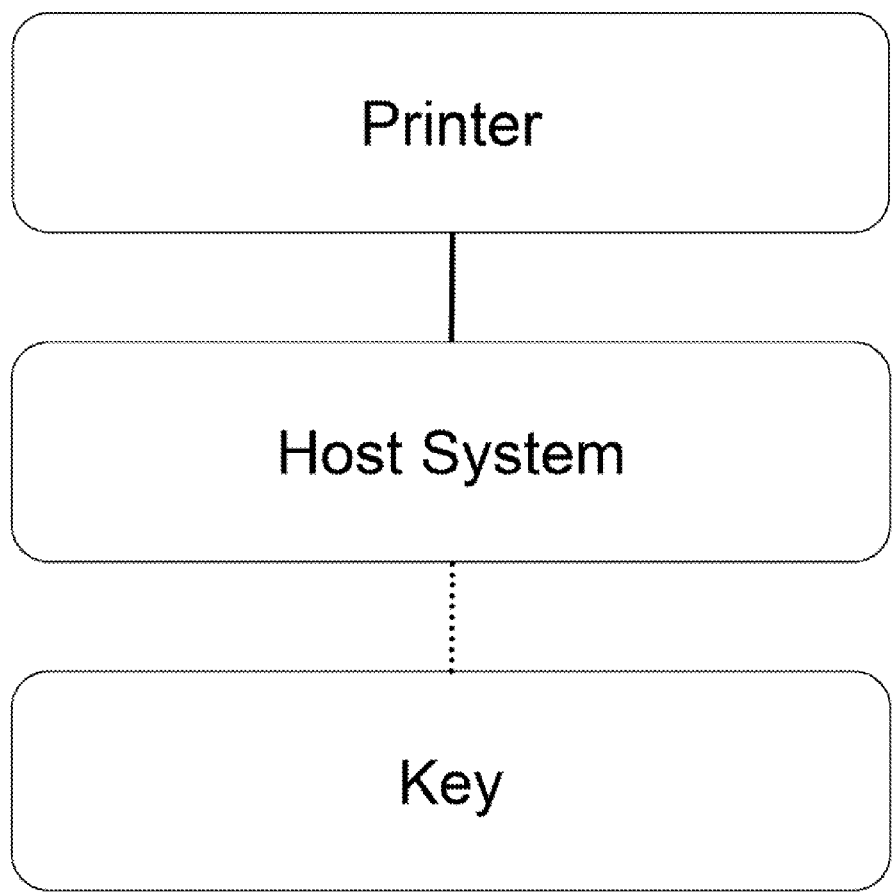
Figure 2A:
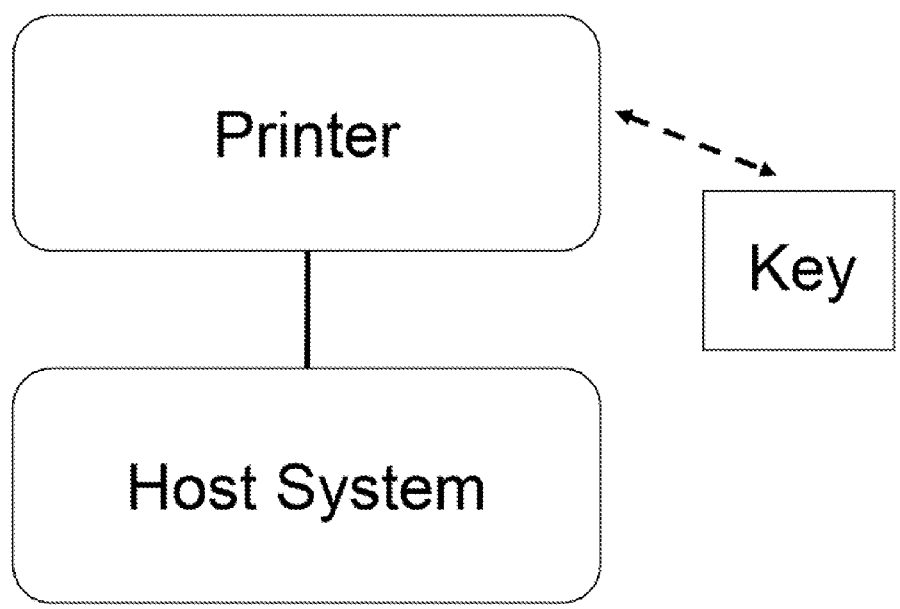
FIGS. 2A and 2B are simplified block diagrams depicting layouts for printer-host systems used with wireless physical keys.
Figure 2B:
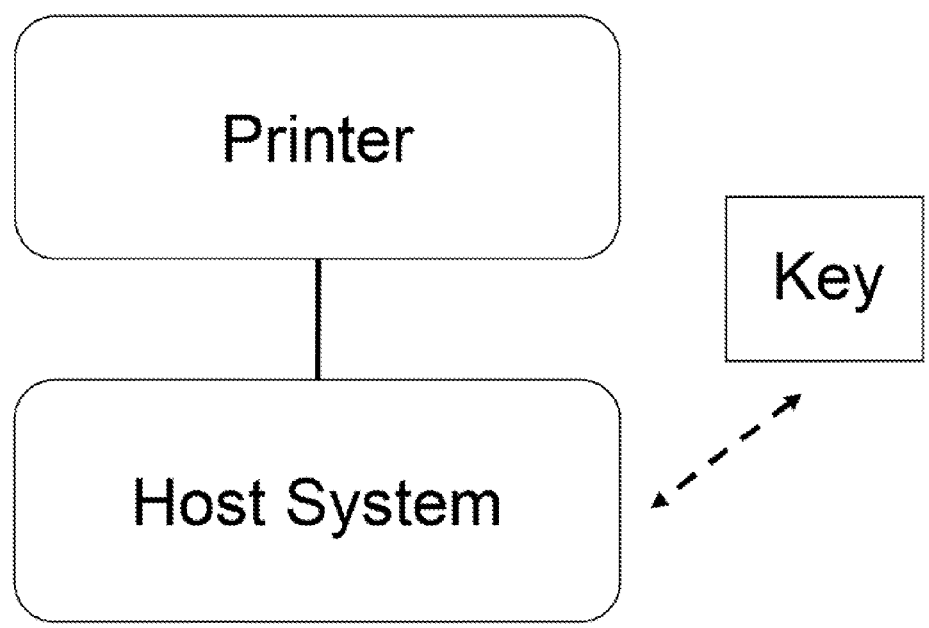

A physical key can be an encrypted USB thumb drive. For a physical key, the key interface can comprise a wired connection such as a corresponding USB port (FIGS. 1A/1B). Alternatively, for a physical key, the key and key interface can support a secure wireless connection, such as Wi-Fi or Bluetooth® (FIG. 2).

The physical key can be a key/button that was bundled with the printer or a key designed to be operated on a different printer unit of an identical or similar printer model (e.g. a library printer bank containing identical or similar printer models to that of the operator or a friend's identical or similar model printer).

Figure 3:
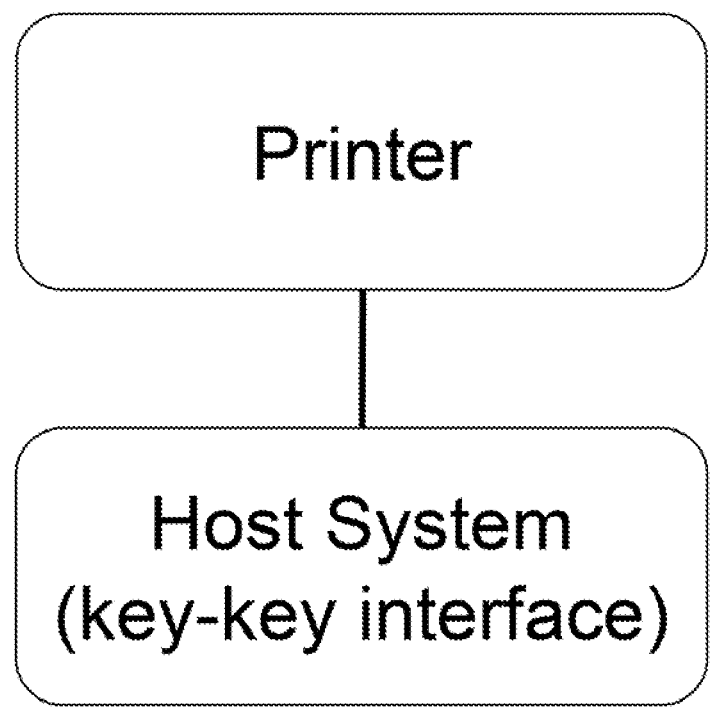
FIG. 3 is a simplified block diagram depicting a layout for printer-host system used with a virtual key.

A virtual key can be a software-based certificate-like key. For a virtual key, the key and key interface can be incorporated into the printer control software (e.g. drivers) (FIG. 3).

Figure 4:
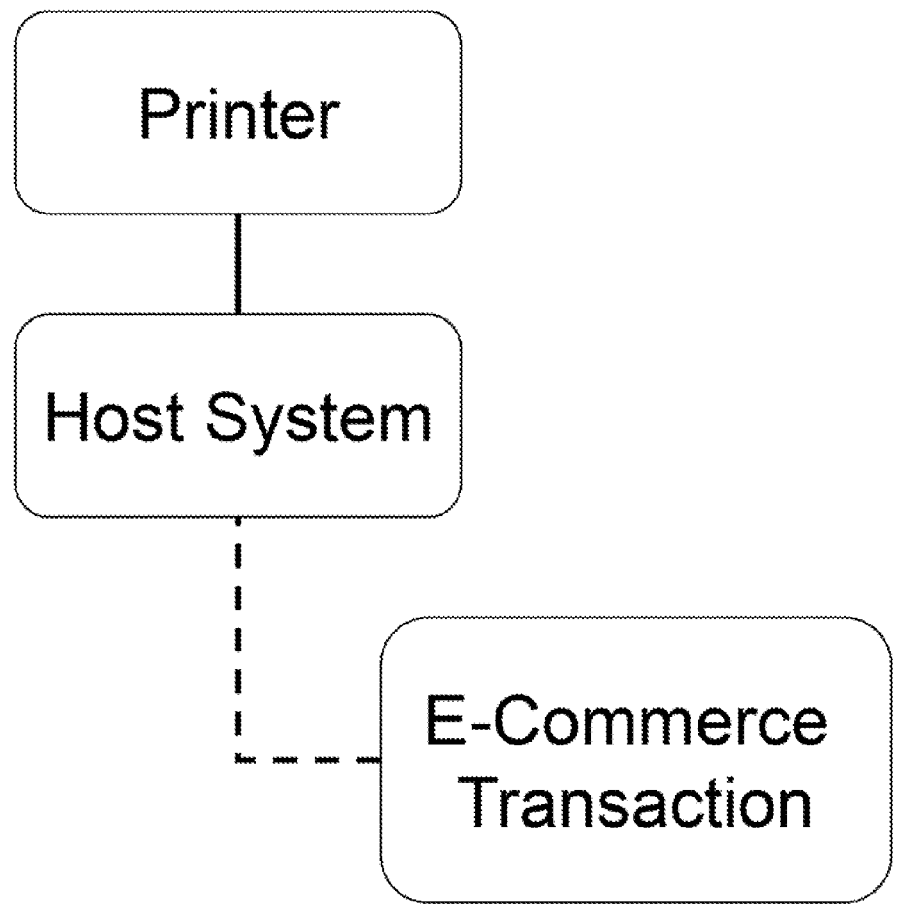
FIG. 4 is a simplified block diagram depicting a layout for a printer-host system used with an e-commerce transaction.

The key contains key data which can include the number of pages the operator is authorized to print ("authorized print count"). Upon initial printer bundle acquisition, the bundle's associated key can come out of the box pre-loaded with a predetermined authorized print count. Or, upon initial printer acquisition, the bundle's associated key does not come out of the box pre-loaded with an authorized print count, but upon and during "installation and registration" of the printer (e.g., with a host system), the key can be loaded with an authorized print count downloaded through an e-commerce transaction (FIG. 4). After the key is loaded with an authorized page count, an operator desiring to print a file can link their key with an associated printer. When the key is linked with the printer or the host system, the printer or host system can read the authorized page count from the key. If the printer or host system determines that the authorized print count equals to or exceeds the number of pages in the print job, the printer is controlled to execute the print job, and the number of printed pages are subtracted from the authorized print count to determine an updated authorized page count. When the operator ultimately needs to print more pages than remain authorized on the key, additional pages at a per page cost can be purchased from a source, typically the printer vendor, using e-commerce methods. After the additional pages are purchased successfully, a count of the additional pages can be written into the key, thereby updating the key's authorized print count. Furthermore, operators can win free "authorized pages" via contests, promotional coupons, or other means, or given gift-cards redeemable for authorized pages.

When the printer's ink supply becomes depleted, under prior art printing models, the printer owner was required to purchase additional ink supplies. Depending upon the number of ink colors of the printer, (e.g., black only, CMYK, multiple black-gray shades, etc.), this was considered an expensive stage of printer maintenance and in some cases printer owners perceive that it would be more economical to just purchase a new printer rather than purchase new ink supplies.

With the current method, however, when the printer's ink supply becomes depleted, the printer owner is provided with a new ink supply at no or insignificant cost by the printer manufacturer or an associated fulfillment entity. A new ink supply can be automatically sent to the printer owner when the printer sends a low ink signal to its driver software and the printer vendor (by, e.g., by the internet). This ink supply replacement model makes printing according to the current method very economical, predictable, and convenient because it removes all costs associated with ink replenishment. For example, with the current method, a printer owner can allow others to print jobs (especially large ones) on the owner's printer because the owner knows that the ink used will be replaced at no or insignificant cost to the printer owner. In some embodiments, the printer bundle may include a display device. When the ink supply is about to be depleted, the display device displays specific information to notify the operator that a new ink supply is needed and the new ink supply can be acquired from the printer vendor at no or insignificant cost.

As previously mentioned, the printer will not operate unless linked to a properly authorized key. For example, the printer will not power up or go from an off-line mode to an on-line mode without the printer being connected to an authorized key. Or, the ink supply can be secured by control circuitry that prohibits printing (e.g. ink release) until the printer is connected to an authorized key. The control circuitry can be physically located at a location in the ink supply where attempting access to that circuitry (in an attempt to bypass it) would destroy the ink supply, such as causing release (spilling) of the ink. The ink supply may be further secured by including a physical lock that can prevent ink supply removal from the printer unless the authorized print count is greater than zero. This helps prevent a black market in ink supplies, e.g., person with zero authorized page count cannot sell or transfer his ink supply to someone else to use.

Furthermore, for enhanced security, any combined number of printer "lock down" methods can be employed that prohibits printing without the printer being connected to an authorized key. For security, key data will be encrypted as to content and authenticity.

It is believed that the embodiment and its advantages will be understood from the foregoing description, and it will be apparent that various changes may be made thereto without departing from the spirit and scope of the disclosure or sacrificing all of its advantages.

What is claimed is:

1. A method of providing printing services, comprising:
   initializing a printer having a key interface and an ink supply;
   obtaining a key for association with the printer through the key interface;
   loading the key with key data pertaining to an authorized page count;
   controlling the key to acquire additional authorized pages as needed;
   providing the printer with additional ink when the printer ink supply is depleted; and
   informing a printer operator that the additional ink is provided at no or insignificant cost.

2. The method of claim 1, further comprising:
   controlling the printer to print pages up to the authorized page count without requiring the operator to acquire additional authorized pages.

3. The method of claim 1, further comprising:
   prohibiting the printer from printing unless authorized by the key data.

4. The method of claim 1, further comprising:
   providing the printer as a docking station;
   providing a dockable host system with printer control software including the key data.

5. The method of claim 1, wherein obtaining the key comprises obtaining a physical key.

6. The method of claim 5, further comprising:
   linking the physical key with the printer by a wired connection.

7. The method of claim 5, further comprising:
   linking the physical key with the printer by wireless connection.

8. The method of claim 1, wherein obtaining the key comprises obtaining a virtual memory key.

9. The method of claim 1, further comprising:
   obtaining the key data during an e-commerce transaction.

10. The method claim 1, further comprising:
    preventing the ink supply from being removed from the printer unless the authorized print count is greater than zero.

11. A printing control method, comprising:
    obtaining a key for association with a printer having a key interface;
    loading the key with data pertaining to an authorized page count;
    controlling the key to acquire additional authorized pages as needed;
    linking the key with the printer through the key interface;
    controlling the printer to print a number of pages less than the authorized page count.

12. The printing method of claim 11, wherein obtaining a key for association with a printer comprises an operator purchasing a printer with dedicated key.

13. The printing method of claim 11, further comprising:
    preventing a ink supply of the printer from being removed from the printer unless the authorized print count is greater than zero.

14. The printing method of claim 11, further comprising:
    providing the printer with additional ink when an ink supply of the printer is depleted;
    informing a printer operator that the additional ink is provided at no or insignificant cost.

* * * * *